United States Patent
Makarov et al.

(10) Patent No.: US 9,460,305 B2
(45) Date of Patent: Oct. 4, 2016

(54) SYSTEM AND METHOD FOR CONTROLLING ACCESS TO ENCRYPTED FILES

(71) Applicant: Kaspersky Lab ZAO, Moscow (RU)

(72) Inventors: Alexander N. Makarov, Moscow (RU); Evgeniya P. Kirikova, Moscow (RU); Nikita M. Voitov, Moscow (RU); Damir R. Shiyafetdinov, Moscow (RU); Vladislav I. Ovcharik, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/096,150

(22) Filed: Dec. 4, 2013

(65) Prior Publication Data

US 2015/0046706 A1 Feb. 12, 2015

(30) Foreign Application Priority Data

Aug. 7, 2013 (RU) ................................. 2013136975

(51) Int. Cl.
 *G06F 17/00* (2006.01)
 *G06F 21/62* (2013.01)
 *H04L 29/06* (2006.01)

(52) U.S. Cl.
 CPC ........... *G06F 21/6218* (2013.01); *H04L 63/20* (2013.01)

(58) Field of Classification Search
 CPC ........................... H04L 63/20; G06F 21/6218
 USPC .......................................................... 726/1
 See application file for complete search history.

(56) References Cited

U.S. PATENT DOCUMENTS

| | | | |
|---|---|---|---|
| 5,796,825 A | 8/1998 | McDonnal et al. | |
| 7,069,591 B1 * | 6/2006 | Weicher | 726/26 |
| 7,096,358 B2 | 8/2006 | Zizzi | |
| 7,640,589 B1 | 12/2009 | Mashevsky et al. | |
| 2004/0098606 A1 * | 5/2004 | Tan | G06Q 30/02 726/1 |
| 2006/0090169 A1 * | 4/2006 | Daniels et al. | 719/320 |
| 2007/0006322 A1 * | 1/2007 | Karimzadeh et al. | 726/27 |
| 2007/0101405 A1 * | 5/2007 | Engle et al. | 726/4 |
| 2007/0143626 A1 * | 6/2007 | Okuda | 713/183 |

(Continued)

FOREIGN PATENT DOCUMENTS

| | | |
|---|---|---|
| RU | 2006131456 A | 3/2008 |
| RU | 2364049 C2 | 8/2009 |

(Continued)

OTHER PUBLICATIONS

Tatsuo Nakajima et al. "User-level Real-Time Network System on Microkernel-based Operation Systems," 1998 Kluwer Academic Publishers, Boston, pp. 45-60.*

(Continued)

*Primary Examiner* — Luu Pham
*Assistant Examiner* — Canh Le
(74) *Attorney, Agent, or Firm* — Arent Fox LLP; Michael Fainberg (57) ABSTRACT

Disclosed are systems, methods and computer program products for controlling access to encrypted files. In one aspect, the system detects a request from an application to access an encrypted file. The system identifies the application that requested access to the encrypted file and one or more file access policies associated with the application. The file access policy specifies at least a file access method associated with the application. The system then controls access to the file based on the identified one or more file access policies.

16 Claims, 3 Drawing Sheets

(56) References Cited

U.S. PATENT DOCUMENTS

| | | | |
|---|---|---|---|
| 2007/0266373 A1* | 11/2007 | Liu | G06F 9/44589 717/126 |
| 2012/0036370 A1 | 2/2012 | Lim et al. | |
| 2012/0110674 A1 | 5/2012 | Belani et al. | |
| 2012/0254613 A1* | 10/2012 | Nimura | G06F 21/572 713/168 |
| 2013/0125233 A1 | 5/2013 | Bush et al. | |
| 2013/0174215 A1 | 7/2013 | Mattsson | |
| 2014/0067864 A1* | 3/2014 | Holland et al. | 707/783 |
| 2014/0115693 A1* | 4/2014 | Schieman | G06F 21/53 726/17 |
| 2014/0289851 A1* | 9/2014 | Klein et al. | 726/23 |

FOREIGN PATENT DOCUMENTS

| | | |
|---|---|---|
| RU | 2405198 C2 | 11/2010 |
| RU | 101233 U1 | 1/2011 |
| RU | 115528 U1 | 4/2012 |

OTHER PUBLICATIONS

Thomas P. Mulkerin et al. "SATS Link Independent Data Concepts," 2005 IEEE, pp. 1-12.*

Article: "Tests to verify the effectiveness of destruction of data storage on flash memory Samurai Flash Drive, the device". http://helpdesk24.ru/catalog/view/983/; published Mar. 20, 2012.

Nora Cuppens-Boulahia et al: "Negotiation of Prohibition: An Approach Based on Policy Rewriting", Advances in Digital Forensics IV, vol. 278, Jan. 1, 2008 (Jan. 1, 2008), pp. 173-187, XP055180452, Boston, MA ISSN: 1571-5736, DOI: 10.1007/978-0-387-09699-5_12 ISBN: 978-0-38-784927-0.

* cited by examiner

SYSTEM AND METHOD FOR CONTROLLING ACCESS TO ENCRYPTED FILES

CROSS-REFERENCE TO RELATED APPLICATIONS

This application claims benefit of priority under 35 U.S.C. 119(a)-(d) to a Russian Application No. 2013136975 filed on Aug. 7, 2013, which is incorporated by reference herein.

TECHNICAL FIELD

The present disclosure generally relates to the field of computer and network security, and more specifically to systems and methods for controlling access to encrypted files.

BACKGROUND

In modern society, the demand for information security of corporate networks and its users is constantly growing. Data theft and leaks from corporate networks have increased in frequency, and the financial losses cause substantial harm to businesses. Due to vulnerabilities in software and human factors, data transmitted on a corporate network can be intercepted by malware and hackers. Therefore, the encrypting of data on workstations, notebook computers, mobile devices and removable storage media used in corporate networks becomes necessary.

The classic system for encryption of files and directory contents on computers operates in accordance with file access policies that determine which groups of files must be encrypted and which files may not. In such a system, the most vulnerable and critical files (such as files containing confidential information whose loss is undesirable to its owner) are typically encrypted on disk and if an application tries to gain access to such files the system either provides them to the authorized application in decrypted form or blocks access to them.

However, when an authorized application opens an encrypted file, it can transfer the file outside the corporate network, which may cause data leaks. Therefore, there is a need for improved technique for controlling access to encrypted files on corporate networks.

SUMMARY

Disclosed are systems, methods and computer program products for controlling access to encrypted files. In one example aspect, the system detects a request from an application to access an encrypted file. The system identifies the application that requested access to the encrypted file and one or more file access policies associated with the application. The file access policy specifies at least a file access method associated with the application. The system then controls access to the file based on the identified one or more file access policies.

In one aspect, in controlling access to the encrypted file, the system may provide access to the encrypted file, decrypt and provide access to the decrypted file, or block access to the encrypted file.

In another aspect, a file access policy further specifies: whether the file to be deleted after a certain number of blocked attempts to access the file, and whether to send information about the blocked attempts to access the file to a security service.

In another aspect, a file access policy further specifies whether to check for presence of a network connection and to determine an appropriate file access method based on presence or absence of an existing network connection.

In another aspect, a file access policy further specifies whether to allow access to encrypted or decrypted file based on a type of a user account of a user of the application that requested access to the encrypted file.

In another aspect, the system requests a user of the application to provide a password for accessing the encrypted file.

In another aspect, the system may identify the application by a name of its executable file, a hash sum of the executable file, a digital signature of the executable file, a metadata of the executable file, or information contained in resources of the executable file.

In another aspect, one or more file access policies associated with the application may have different priorities that determine order in which said policies applied.

In another aspect, a file access policy associated with a parent application that requested access to the encrypted file may also apply to a child application that received access to the encrypted file from the parent application.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments of the present invention are described herein in the event context of systems, methods and computer program products for controlling access to encrypted files. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
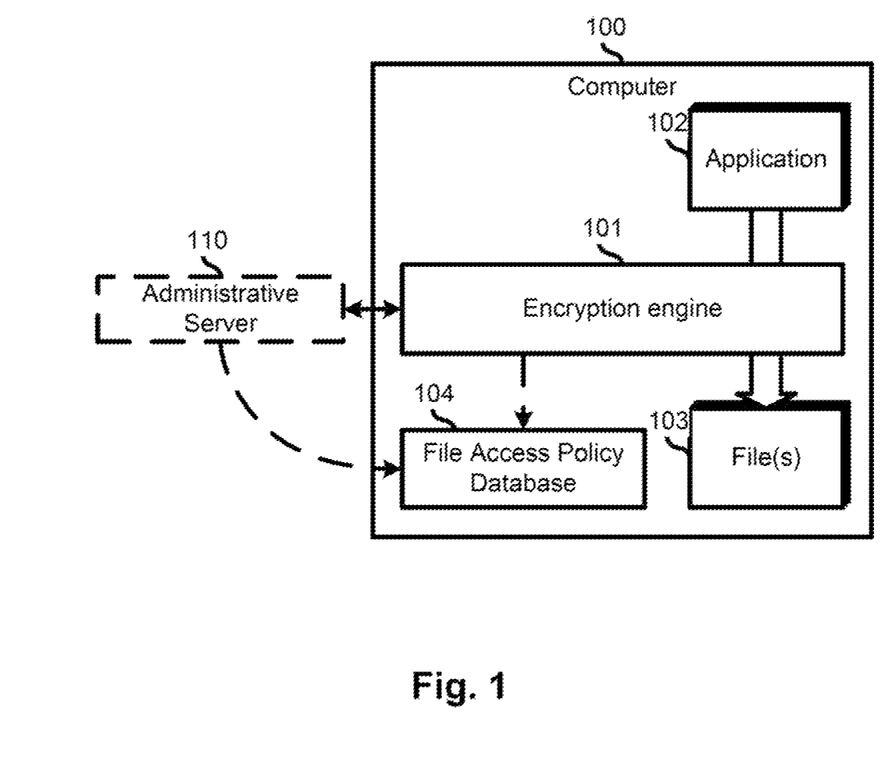
FIG. 1 illustrates a block diagram of an example system for controlling access to encrypted files according to aspects of the present invention.

FIG. 1 illustrates an example system for controlling access to encrypted files according to aspects of the present invention. In one example aspect, the system includes a number of personal computers 100. Each computer 100 may have a plurality of software applications 102 installed thereon. The applications 102 are configured to access various files 103. Accessing a file includes, but not limited to, opening a file, reading or writing into the files, copying a file, and performing other operations on the file 103. The files 103 may be stored on one or more hard disk drives of the computer 100 or on a removable storage media connected to the computer 100. In one example aspect, certain files 103 may be encrypted using, for example, a symmetrical or asymmetrical encryption, or other type of encryption technology.

In one exemplary aspect, the computer 100 also includes a file access policy database 104 that contains access policies for encrypted and unencrypted files 103 for different applications 102. The database 104 may be any known database, such as a relational or hierarchical database, and it can reside on an external storage device, such as a hard disk, a solid state drive, etc., on a network storage, or in the random access memory of computer 100.

The computer 100 also includes an encryption engine 101, which is connected to the database 104. In one aspect, the engine 101 is configured to intercept requests of applications 102 to access files 103, and control access of the application 102 to files 103 depending on the policies for granting of file access rights. The encryption engine 101 may intercept requests of applications 102 to access (e.g., open, read, write, etc.) files 103 using any of the following techniques: by means of a driver controlling the opening of files (such as a file system filter driver); by means of intercepting calls of operating system APIs (application programming interfaces); by using the APIs provided by the applications 102; or using other known methods.

In one exemplary aspect, the system may additionally include an administrative server 110, connected to the encryption engine 101 and the file access policy database 104. The administrative server 110 is used to define or change the file access policies. In a particular aspect, the administrative server 110 may send the file access policies to the encryption engine 101, which in turn keeps them in the file access policy database 104. In another aspect, the administrative server 110 may store the file access policies in the file access policy database 104 without the involvement of the encryption engine 101 (for example, by the network, using a supplemental software program, or with publication of the policies on a policy register that is universally accessible over the local network, such as the Active Directory).

In one exemplary aspect, file access policies may contain rules that specify file access rights to files 103 for applications 102. For example, the rules may specify whether to provide a file in encrypted form (ciphertext), to provide a file in decrypted form (plaintext), or block access to the file to the application 102. In another aspect, the file access policies may additionally contain the following rules: delete the file after a certain number of blocked attempts to access the file (e.g., after ten attempts); and send information about the request to grant access to the file to the administrative server 110. In yet another aspect, a password may be asked of the user before the file is provided to the application in decrypted form. In yet another aspect, the file access policies may specify user account access privileges. For example, for a user account with administrator rights, the file access policies may contain a rule that a certain application 102, e.g., Skype® application, should be provided with files in decrypted form. For other user accounts, the file access policies may contain a rule that the same application 102 should be provided with files in encrypted form. In this example, only users with administrator rights can send files on the network in decrypted form. At the same time, other users can send files only in encrypted form, thus reducing the risk of data leaks.

In yet another exemplary aspect, the file access policies may check whether computer 100 is connected to a network. In this case, when the computer 100 is not connected to the network, certain files (e.g., Skype files) may be provided to application 103 running on computer 100 in plaintext. When a connection to the network is present, the same files may be provided to the computer 100 in ciphertext, thereby preventing potential data leaks.

In another example, for applications 103 combining file management with file viewing (such as the FAR Manager application), the file access policies may also depend on a user account. Thus, for example, encrypted files may be provided to the computer administrator for viewing in decrypted form, while for ordinary users they are provided in the form of ciphertext. However, other functions of such an application can be the same for all users, so that both the computer administrator and other users can have the ability to manage computer files 103.

In yet another exemplary aspect, the file access policies may depend on additional parameters, such as, for example: the type, extension, size, or category of file (such as for work or personal use), the presence of certain keywords or byte sequences in the file, and other parameters. In this example, even an initially unencrypted file may be provided to an application in encrypted form if the file contains a certain set of the aforementioned parameters. For example, if the file contains company's financial records, it may be encrypted in the computer's random access memory, and provided to the application in ciphertext. The parameters can be kept in the file attributes or in a separate file on the computer 100. The definition of the parameters in different aspects can be done by the encryption engine 101 either when creating the file or when an application requests access to the file.

Figure 2:
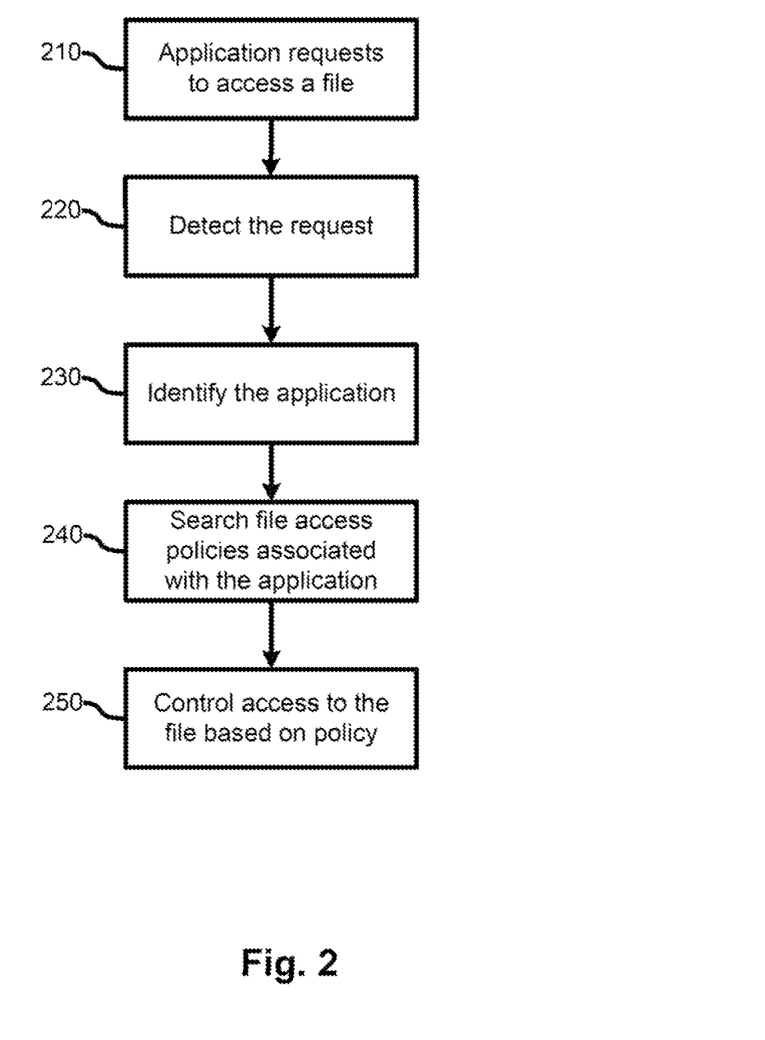
FIG. 2 illustrates a flow diagram of an example method of controlling access to encrypted files according to aspects of the present invention.

FIG. 2 illustrates an example method of controlling access to encrypted files according to aspects of the present invention. In step 210, the application 102 makes a request to access a file 103. In step 220, the encryption engine 101 detects/intercepts the request and, in step 230, determines which application is requesting access to the file. In one aspect, the application may be identified from the name of its executable file (such as "Skype.exe"). Any other known methods can also be used to identify the application, such as: its hash sum; its digital signature; metadata of the executable file (such as its size, date of creation); and information contained in the resources of the executable file (such as the author's name, the file version number).

Next, in step 240, the encryption engine 101 may use the file access policy database 104 to determine the application 102 and the file access policy corresponding to this application. In the next step 250, the encryption engine 101 provides the application 102 with access rights to the requested file in accordance with the file access policy associated with the application 102. As noted above, in one exemplary aspect, the file access policies may contain rules whereby the application 102 can be provided with the file in encrypted form (ciphertext), the file in decrypted form (plaintext), or the access to the file will be blocked for the application.

In one exemplary aspect, the encryption engine 101 may additionally monitor third-party applications (e.g., child processes or threads) started by the original application 102. In this example, the file access policies may be inherited by the third-party applications. For example, when downloading a document in PDF format in Internet Explorer®, the browser will open an application to view PDF documents, such as Adobe Reader®. Thus, if the file access policy database 104 contains a rule that certain files are provided to Internet Explorer® in decrypted form, this rule may also be applied to the Adobe Reader® application.

In one exemplary aspect, applications can be divided into categories, as described in greater detail in a commonly owned U.S. Pat. No. 7,640,589, which is incorporated by reference herein. Such categories may include, for example, trusted applications, untrusted applications, and unknown applications. In yet another exemplary aspect, the file access policies may be extended to categories of applications, rather than individual applications.

In one exemplary aspect, when several file access policies apply to the same application, the file access policy may specify different priorities to the different applications, so that the encryption engine 101 can use the policy with the highest priority. Table 1 shows example application priorities, and Table 2 shows file access rules associated with different priories.

TABLE 1

| No | Application | Priority |
|---|---|---|
| 1 | Adobe Reader | 1 |
| 2 | Internet Explorer (IE) | 3 |
| 3 | Skype | 2 |
| ... | ... | ... |

TABLE 2

| No | Priority | Rule |
|---|---|---|
| 1 | 1 | Provide plaintext |
| 2 | 2 | Provide ciphertext |
| 3 | 3 | Prohibit access to the file |

According to the first rule of Table 1, the Adobe Reader® application has priority 1, and according to the corresponding rule from Table 2 this application will be provided with a plaintext file. At the same time, if the file was initially encrypted, the encryption engine 101 will decrypt it before providing it to the Adobe Reader® application. According to the second rule of Table 1, the Internet Explorer® application has priority 3, which in turn corresponds to rule 3 of Table 2. According to the identified rule, access of the application to the file will be prohibited. For example, Adobe Reader® application was started by the Internet Explorer. Then, in order to determine which rule from Table 1 should be used to provide files to the Adobe Reader®, the priority of the rules will be used. Thus, Table 3 shows example rules for selecting the file access policy among several permissible policies having different priorities.

TABLE 3

| No | Condition | Priority selection rule |
|---|---|---|
| 1 | From 8:00 a.m. to 4:30 p.m. | The inherited policy has priority 1 |
| 2 | Rest of the time | The inherited policy has the priority of the application from which it is inherited |

In the above-described example, a file in PDF format opens the application Internet Explorer®, which in turn calls up the Adobe Reader. As a result, the Adobe Reader opens the file. In this case, Adobe Reader may inherit the policy from Internet Explorer®, according to which access of the application to the file will be prohibited. At the same time, a policy has already been determined for the Adobe Reader in the file access policy database 104 according to which the encryption engine 101 will provide plaintext to the application. For this reason, it becomes necessary to select the policy with highest priority. In one sample aspect, the priority selection rule may depend on various conditions (such as the time of day; the use of additional authentication means, such as a token; the rights of the user account; the security policies, and so on). In a particular aspect, the administrator of the administrative server 110 or the administrator of the computer 100 can assign, alter or remove the priority selection rule, as well as the file access policy. According to Table 3, in the above-considered example, when condition 1 is fulfilled the inherited policy will have priority 1, which coincides with the priority of the rule for Adobe Reader® that is contained in the file access policy database 104. As a result, the Adobe Reader® will be provided with plaintext, in keeping with the inherited policy 1 from Table 2. But if condition 2 is fulfilled, the inherited policy will have the priority of Internet Explorer®, equal to 3. Therefore, the access to the file will be prohibited to the Adobe Reader.

The described system and method of providing applications with access rights to computer files can be used to solve various problems relating to protection of critical data. For example, for applications performing a backup copying of data, a file access policy can be specified according to which files will be provided to applications in the form of ciphertext. As a result, critical files may be saved in a backup storage in encrypted form, thus increasing the level of security. Similar file access policies may also be specified for applications performing a synchronization of data on the local area network or via the internet (so-called cloud services). Another example for the use of the present system is the secure sending of messages by means of email clients and IM (instant messaging) applications. If a policy is specified for such an application according to which files will be provided to the application in encrypted form, this may help improve the security of the transmitted data even when an email client or the user account of the IM client user have been broken into by a hacker. In such a situation, the hacker will not be able to decrypt the files without knowing decryption keys. Yet another example is the policies that are imposed on portable devices. Thus, for example, a work notebook may contain work files in encrypted form and home files (such as photo, video and audio files) in decrypted form. Thus, when the notebook is within the company network, access to the work files can be transparent (that is, from the standpoint of the user, working with the encrypted files will be the same as working with the non-encrypted files). But when the user is working on the notebook at home, access to the work files may be prohibited to the majority of applications, and files may be provided only to some applications in the form of ciphertext.

Figure 3:
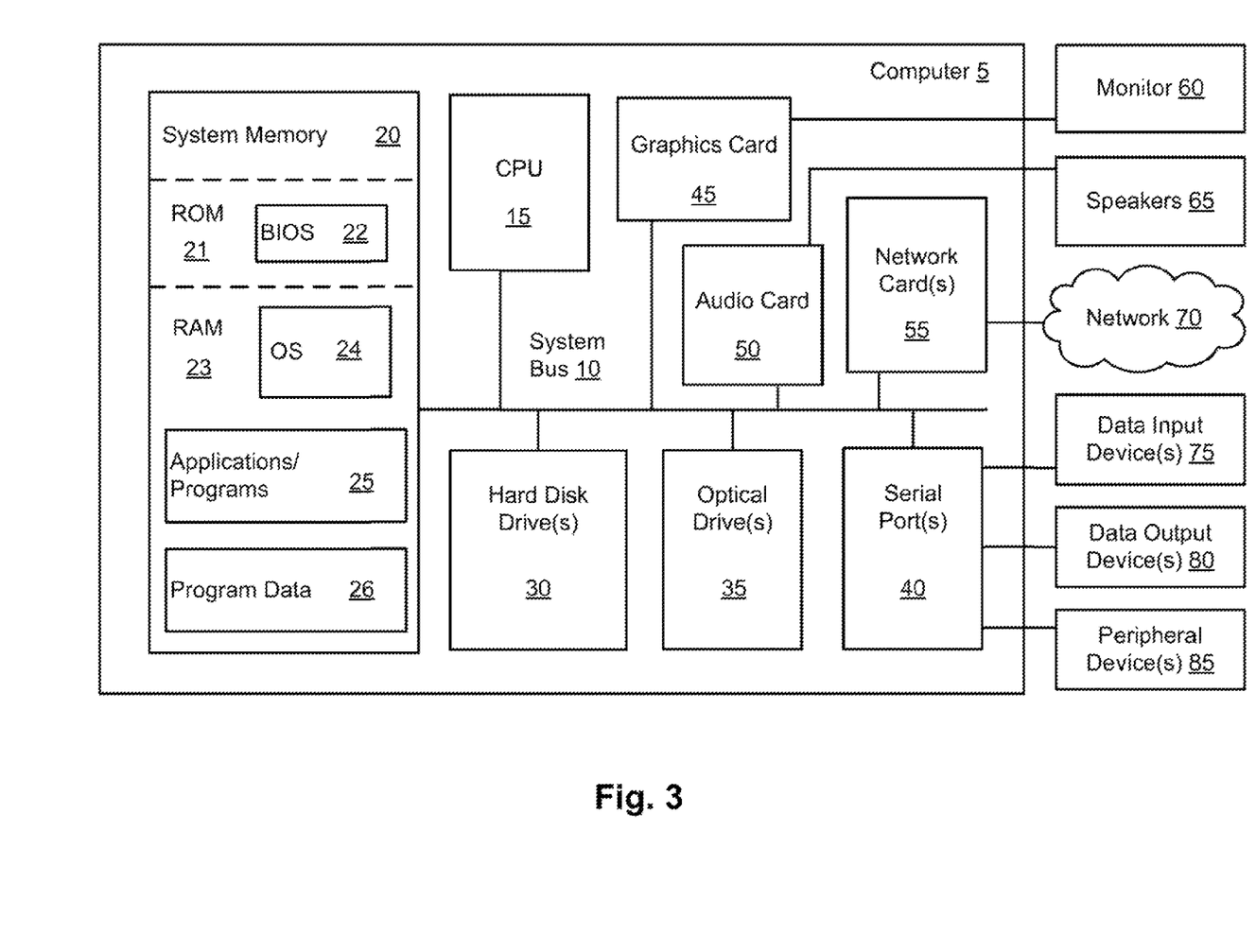
FIG. 3 illustrates a block diagram of an example general-purpose computer system on which the system and method for controlling access to encrypted files may be implemented.

FIG. 3 depicts one example aspect of a general-purpose computer system 5 that can be used to implement the disclosed systems and methods for controlling access to encrypted files. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of engine. The term "engine" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor of a general purpose computer (such as the one described in greater detail in FIG. 3 above). Accordingly, the engine can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to encrypted files, the method comprising:

storing, in a database, priority information assigned to a plurality of applications and a plurality of file access policies that are respectively assigned to the priority information for the plurality of applications, where the plurality of file access policies each specify a different rule for accessing an encrypted file, including (i) providing access to the encrypted file, (ii) decrypting the encrypted file and providing an access to a decrypted file, and (iii) blocking access to the encrypted file;

detecting, via a processor, a request from a first application of the plurality of applications to access the encrypted file;

identifying the first application that requested access to the encrypted file including identifying, in the database, a priority assigned to the first application, and, the file access policy assigned to the priority of the first application;

identifying a child application activated by the first application for accessing the encrypted file including identifying, in the database, a priority assigned to the child application;

determining a condition associated with the request from the first application, the condition relating to at least one of a time criteria and a security policy relating to the request;

selecting a first priority selection rule if the condition satisfies a first rule selection condition of whether the request by the first application is made during a first time of day and a second priority selection rule if the condition satisfies a second rule selection condition of whether the request by the first application is made during a second time of day different than the first time of day;

if the first priority selection rule is selected, controlling access to the encrypted file by the child application based on the access policy, assigned to the priority of the child application; and if the second priority selection rule is selected, controlling access to the encrypted file by the child application based on the file access policy, assigned to the priority of the first application that activated the child application.

2. The method of claim 1, wherein at least one of the identified file access policies further specifies: whether to remove the encrypted file after a certain number of blocked attempts to access the encrypted file, and whether to send information about the blocked attempts to access the encrypted file to a security service.

3. The method of claim 1, wherein at least one of the identified file access policies further specifies whether to check for presence of a network connection and to determine an appropriate rule based on a presence or an absence of an existing network connection.

4. The method of claim 1, wherein at least one of the identified file access policies further specifies whether to allow an access to encrypted or decrypted file based on a type of a user account of a user of the first application or child application with higher priority that request the access to the encrypted file.

5. The method of claim 1, further comprising: request a user of at least one of the first application and child applications to provide a password for accessing the encrypted file.

6. The method of claim 1, wherein identifying at least one of the first application and child applications further includes identifying one or more of: a name of an executable file of the application, a hash sum of the executable file, a digital signature of the executable file, a metadata of the executable file, and information contained in resources of the executable file.

7. A system for controlling access to encrypted files, the system comprising:
a database configured to store priority information assigned to a plurality of applications and a plurality of file access policies that are respectively assigned to the priority information for the plurality of applications, where the plurality of file access policies each specify a different rule for accessing an encrypted file, including: (i) providing access to the encrypted file, (ii) decrypting the encrypted file and providing an access to a decrypted file, and (iii) blocking access to the encrypted file; and a hardware processor configured to:

detect a request from a first application of a plurality of applications to access the encrypted file;

identify the first application that requested access to the encrypted file including identifying, in the database, a priority assigned to the first application, and, the file access policy assigned to the priority of the first application;

identify a child application activated by the first application for accessing the encrypted file including identifying, in the database, a priority assigned to the child application;

determine a condition associated with the request from the first application, the condition relating to at least one of a time criteria and a security policy relating to the request;

select a first priority selection rule if the condition satisfies a first rule selection condition of whether the request by the first application is made during a first time of day and a second priority selection rule if the condition satisfies a second rule selection condition of whether the request by the first application is made during a second time of day different than the first time of day;

if the first priority selection rule is selected, control access to the encrypted file by the child application based on the access policy, assigned to the priority of the child application; and if the second priority selection rule is selected, control access to the encrypted file by the child application based on the file access policy, assigned to the priority of the first application that activated the child application.

8. The system of claim 7, wherein at least one of the identified file access policies further specifies: whether to remove the encrypted file after a certain number of blocked attempts to access the encrypted file, and whether to send information about the blocked attempts to access the encrypted file to a security service.

9. The system of claim 7, wherein at least one of the identified file access policies further specifies whether to check for presence of a network connection and to determine an appropriate rule based on a presence or an absence of an existing network connection.

10. The system of claim 7, wherein at least one of the identified file access policies further specifies whether to allow an access to encrypted or decrypted file based on a type of a user account of a user of the first application or child application with the higher priority that requested the access to the encrypted file.

11. The system of claim 7, wherein to identify at least one of the first application or child application, the processor is further configured to identify one or more of: a name of an executable file of the application, a hash sum of the executable file, a digital signature of the executable file, a metadata of the executable file, and information contained in resources of the executable file.

12. A computer program product stored on a non-transitory computer-readable storage medium, the computer program product comprising computer-executable instructions for controlling access to encrypted files, including instructions for:
- storing, in a database, priority information assigned to a plurality of applications and a plurality of file access policies that are respectively assigned to the priority information for the plurality of applications, where the plurality of file access policies each specify a different rule for accessing an encrypted file, including (i) providing access to the encrypted file, (ii) decrypting the encrypted file and providing an access to a decrypted file, and (iii) blocking access to the encrypted file;
- detecting a request from a first application of the plurality of applications to access the encrypted file;
- identifying the first application that requested access to the encrypted file including identifying, in the database, a priority assigned to the first application, and, the file access policy assigned to the priority of the first application;
- identifying a child application activated by the first application for accessing the encrypted file including identifying, in the database, a priority assigned to the child application;
- determining a condition associated with the request from the first application, the condition relating to at least one of a time criteria and a security policy relating to the request;
- selecting a first priority selection rule if the condition satisfies a first rule selection condition of whether the request by the first application is made during a first time of day and a second priority selection rule if the condition satisfies a second rule selection condition of whether the request by the first application is made during a second time of day different than the first time of day;
- if the first priority selection rule is selected, controlling access to the encrypted file by the child application based on the access policy assigned to the priority of the child application; and
- if the second priority selection rule is selected, controlling access to the encrypted file by the child application based on the file access policy assigned to the priority of the first application that activated the child application.

13. The product of claim 12, wherein at least one of the identified file access policies further specifies: whether to remove the encrypted file after a certain number of blocked attempts to access the encrypted file, and whether to send information about the blocked attempts to access the encrypted file to a security service.

14. The product of claim 12, wherein at least one of the identified file access policies further specifies whether to check for presence of a network connection and to determine an appropriate rule based on presence or absence of an existing network connection.

15. The product of claim 12, wherein at least one of the identified file access policies further specifies whether to allow an access to encrypted or decrypted file based on a type of a user account of a user of the first application or child application with higher priority that requested the access to the encrypted file.

16. The product of claim 12, wherein the instructions for identifying at least one of the first application and child applications further include instructions for identifying one or more of: a name of an executable file of the application, a hash sum of the executable file, a digital signature of the executable file, a metadata of the executable file, and information contained in resources of the executable file.

\* \* \* \* \*